United States Patent
Seo et al.

(10) Patent No.: US 7,324,445 B2
(45) Date of Patent: Jan. 29, 2008

(54) METHOD AND APPARATUS FOR REPRODUCING A DATA STREAM HAVING MULTIPLE REPRODUCTION PATHS RECORDED ON A RECORDING MEDIUM

(75) Inventors: Kang Soo Seo, Kyunggi-do (KR);
Byung Jin Kim, Kyunggi-do (KR);
Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 10/720,284

(22) Filed: Nov. 25, 2003

(65) Prior Publication Data
US 2004/0105349 A1    Jun. 3, 2004

(30) Foreign Application Priority Data
Nov. 27, 2002    (KR) .................... 10-2002-0074239

(51) Int. Cl.
*H04L 1/00*    (2006.01)
(52) U.S. Cl. .................... 370/230; 370/235; 370/421
(58) Field of Classification Search .................... None
See application file for complete search history.

(56) References Cited

U.S. PATENT DOCUMENTS 6,584,273 B1 *    6/2003    Ashley et al. ................ 386/52

OTHER PUBLICATIONS

Kelly et al, Virtual Editing of MPEG-2 Streams, IEEE, pp. 795-801, 2001.*
Luitjens et al, Storing Digital Video Using an Advanced Optical Device: Data Allocation and Simultaneous Record and Playback, IEEE, pp. 256-257, 2001.*

* cited by examiner

*Primary Examiner*—Frank Duong
(74) *Attorney, Agent, or Firm*—Harness, Dickey & Pierce, P.L.C.

(57) ABSTRACT

The present invention relates to method and apparatus for reproducing a data stream having a multiple reproduction paths recorded on a high-density optical disk. The present method ensures seamless reproduction of video and audio data of a multi-path data stream by removing possible buffer underrun even when the reproduction path is changed during reproduction.

17 Claims, 5 Drawing Sheets

METHOD AND APPARATUS FOR REPRODUCING A DATA STREAM HAVING MULTIPLE REPRODUCTION PATHS RECORDED ON A RECORDING MEDIUM

FOREIGN PRIORITY

The present invention claims priority under 35 U.S.C. 119 on Korean Application No. 10-2002-0074239 filed Nov. 27, 2002; the contents of which are incorporated by reference in their entirety.

BACKGROUND OF THE INVENTION

1. Field of the Invention

The present invention relates to method and apparatus for reproducing a data stream having multiple paths recorded on a high-density recording medium.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (called 'BD-RE' in general) is one example of these new optical disks.

A BD-RE can store a multi-path data stream, e.g., a data stream having multiple stories, multiple parental levels, or multiple angles. Therefore, a disk recording/reproducing apparatus for a BD-RE has to make seamless change from a current path to another path during reproduction of a multi-path stream on a BD-RE when a user requests path change.

By the way, the standardization for a high-density read-only optical disk such as a Blu-ray ROM disk (called 'BD-ROM') is still under way. A BD-ROM can be also manufactured such that it includes a multi-path data stream.

Therefore, an effective method for enabling a seamless path change during reproduction of a multi-path data stream recorded on such a high-density optical disk is strongly demanded.

SUMMARY OF THE INVENTION

It is an object of the present invention to provide method and apparatus that makes smooth path change without buffer underruns even when the reproduction path is changed during reproduction of a multi-path data stream.

A method for reproducing a multi-path data stream recorded on a high-density optical disk in accordance with the present invention is characterized in that it comprises the steps of: reproducing the multi-path data stream; responsive to a request for a path change, checking if the size of buffered data stream of a current path being reproduced exceeds a preset reference; and delaying jumping operation to a data stream of a target path specified by the request based on the checking result.

Another method for reproducing a multi-path data stream recorded on a high-density optical disk in accordance with the present invention is characterized in that it comprises the steps of (a): reproducing the multi-path data stream; responsive to a request for a path change, checking if an entry point pointing to a data stream interval of a current path being reproduced falls within a range of no jumping blocks; and delaying jumping operation to a data stream of a target path specified by the request based on the checking result.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
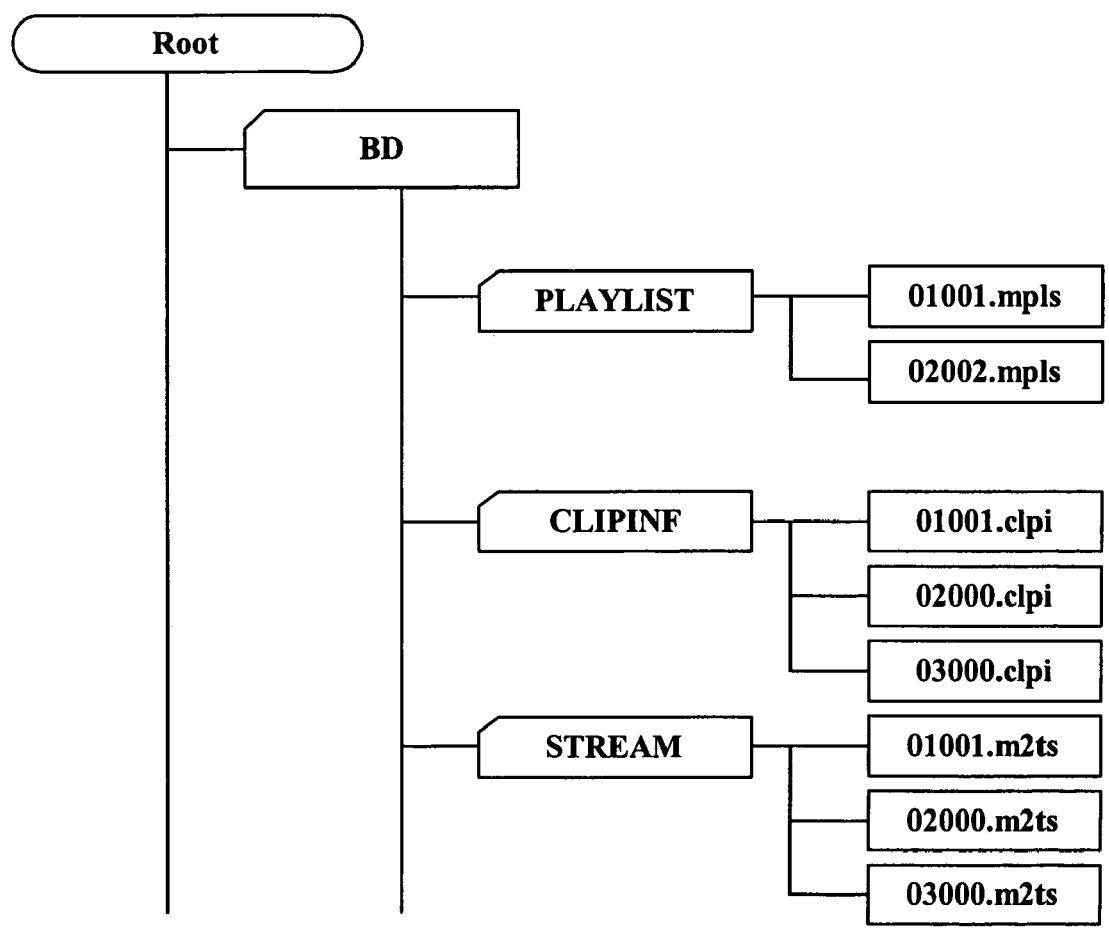
FIG. 1 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will not be described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted single-path and/or multi-path A/V stream files that are called clips or clip files. The A/V stream includes source packets of video and audio.

For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of single- or multi-path A/V stream associated therewith, sequence information, program information and timing information.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis).

Expressed another way, the playlist file identifies playitems, each playitem points to a clip or portion thereof and identifies the clip information file associated with the clip. The clip information file is used, among other things, to map the playitems to the clip of source packets.

The general files (not shown) provide general information for managing the reproduction of the A/V streams recorded on the optical disk.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc.

Figure 2:
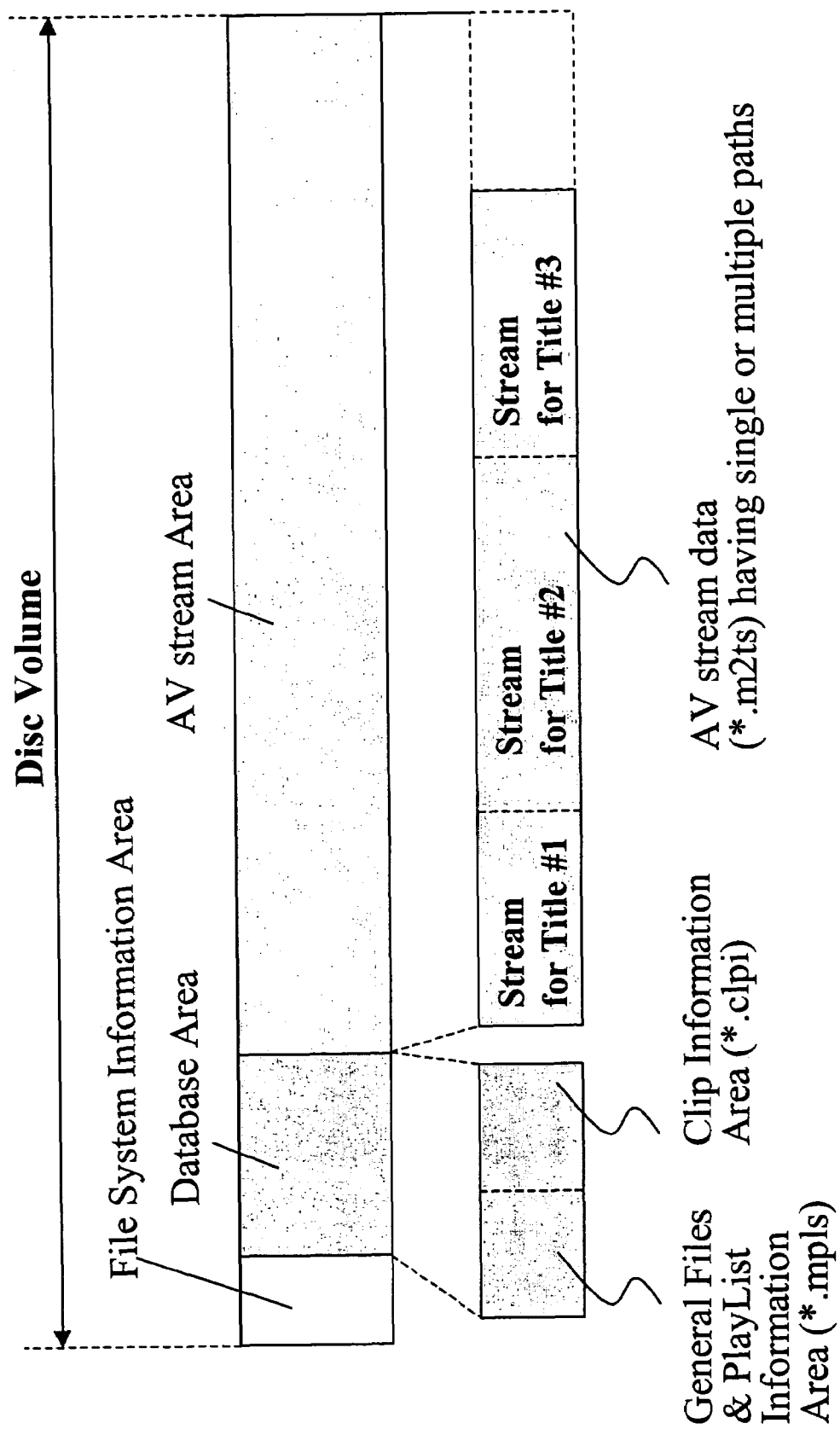
FIG. 2 illustrates an example of a recording medium having the data structure of FIG. 1 stored thereon.

FIG. 2 illustrates an example of a recording medium having the data structure of FIG. 1 stored thereon. As shown, the recording medium includes a file system information area, a data base area and an A/V stream area.

The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINF directory and associated clip information files recorded therein. The A/V stream area has the single- or multi-path A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

A single multi-path data stream is associated with a single title, however, it may be recorded as a plurality of clip files, one clip file corresponding to each path.

Figure 3:
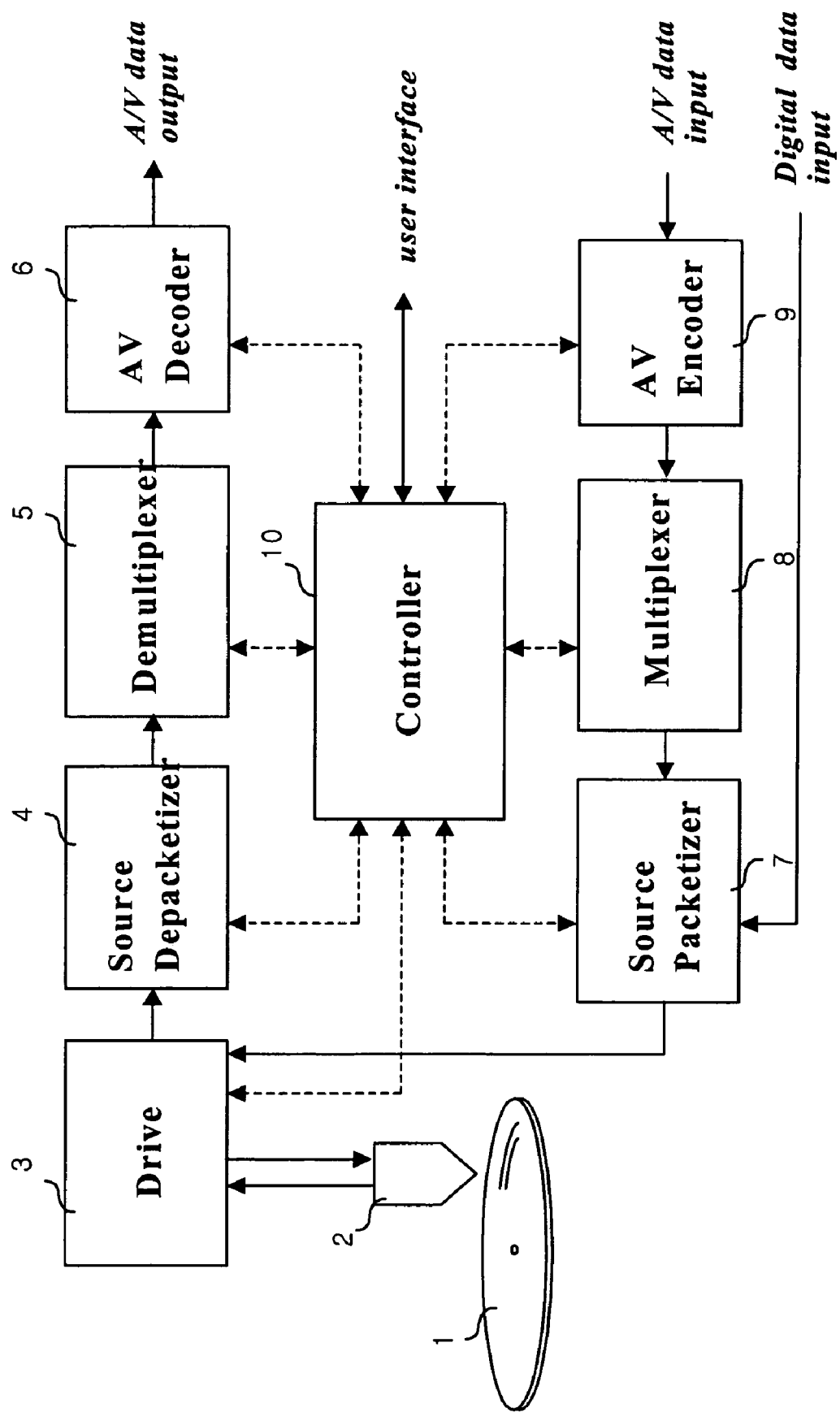
FIG. 3 is diagram illustrating the structure of an optical disc apparatus where a method for reproducing a multi-path data stream according to the present invention is applied.

FIG. 3 illustrates a schematic diagram of an embodiment of an optical disk recording and reproducing apparatus according to the present invention. As shown, an AV encoder 9 receives and encodes data (e.g., single- or multi-path movie video and audio data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk.

As shown in FIG. 3, the operations of the AV encoder 9, the multiplexer 8 and the source packetizer 7 ate controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record on the optical disk the output from the source packetizer 7 as a single clip file or as many clip files as the number of multiple reproduction paths.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1 and 2 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

For example, as mentioned above with respect to the embodiments of the present invention, an A/V data stream of one path among multiple reproduction paths included in a single clip file or a plurality of clip files is reproduced based on the navigation information.

The reproduced source packets of an A/V stream of one path are received by a source depacketizer 4 and converted into appropriate data stream (e.g., an MPEG-2 transport packet stream). A demultiplexer 5 demultiplexes the respective data streams into encoded data of video and audio. An AV decoder 6 decodes the encoded data to produce the original data that was fed to the AV encoder 9.

During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source depacketizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 3 has been described as a recording and reproducing apparatus, it will be understood that only a recording or only a reproducing apparatus may be provided using those portions of FIG. 3 providing the recording or reproducing function.

Hereinafter, a path changing method conducted by the recording/reproducing apparatus of FIG. 3 is described in detail.

In the below explanation, it is assumed that a multi-path data stream is recorded as a plurality of clip files on an optical disk, namely one path to one file.

Each clip information file associated with each clip file contains entry points (EPs) wherein each EP points some interval of an A/V data stream in the clip file. During reproduction of a multi-path data stream, path changes take place on an EP basis.

In addition, the controller 10 performs the path changing operation with reference to a seamless change level (SCL), which is preset to prevent buffer underrun.

Figure 4:
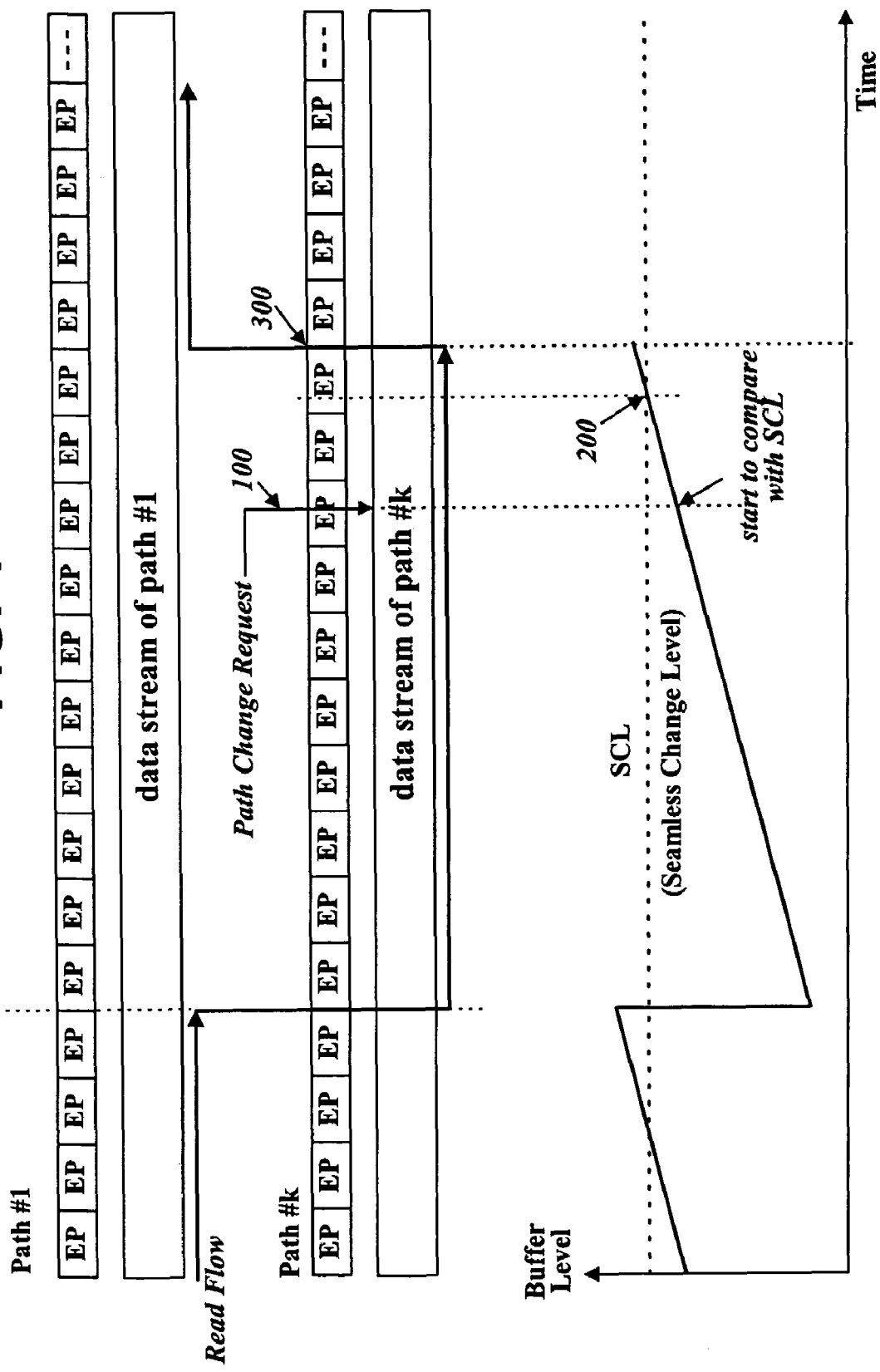
FIG. 4 illustrates a graphical representation of a first embodiment of a reproduction path changing method in accordance with the present invention.

When a reproduction path change is requested during reproduction of a multi-path data stream, the controller 10 performs the path change as shown in FIG. 4, which will now be described in detail.

If a reproduction path change from Path #k to Path #1 is requested (100) during reproduction of the data stream pertaining to Path #k, the controller 10 examines if the size of the Path-k data stream buffered in a buffer is larger than a preset seamless change level (SCL). The buffer may be an internal component of the source depacketizer 4, the demultiplexer 5, or the controller 10.

If the size of the buffered Path-k data stream is not larger than the SCL, the controller 10 does not conduct the path change operation and, instead, keeps buffering the Path-k data stream in the buffer until the buffered size reaches the SCL. When the SCL is exceeded (200), the controller 10 starts to check whether a stream interval pointed by a related EP is completely buffered. If the stream interval is all buffered (300), the controller 10 performs the path change from Path #k to Path #1.

While jump and search by the path change to Path #1 is being conducted, the controller 10 makes the Path-k data stream buffered in the buffer be presented through the source depacketizer 4, the demultiplexer 5 and the AV decoder 6. When the path change to Path #1 finishes, the controller 10 begins to reproduce the Path-1 data stream from the jumped location and buffers the reproduced Path-1 data stream next to the remaining Path-k data stream in the buffer, thereby guaranteeing a seamless presentation at path changed stream position from Path #k to #1.

In another embodiment of the invention, the controller 10 performs a reproduction path changing operation referring to the range of no jumping blocks (NJBs) as well as a seamless change level (SCL). The range of NJBs shall be set to cover a minimum stream length that hardly causes a buffer underrun.

Figure 5:
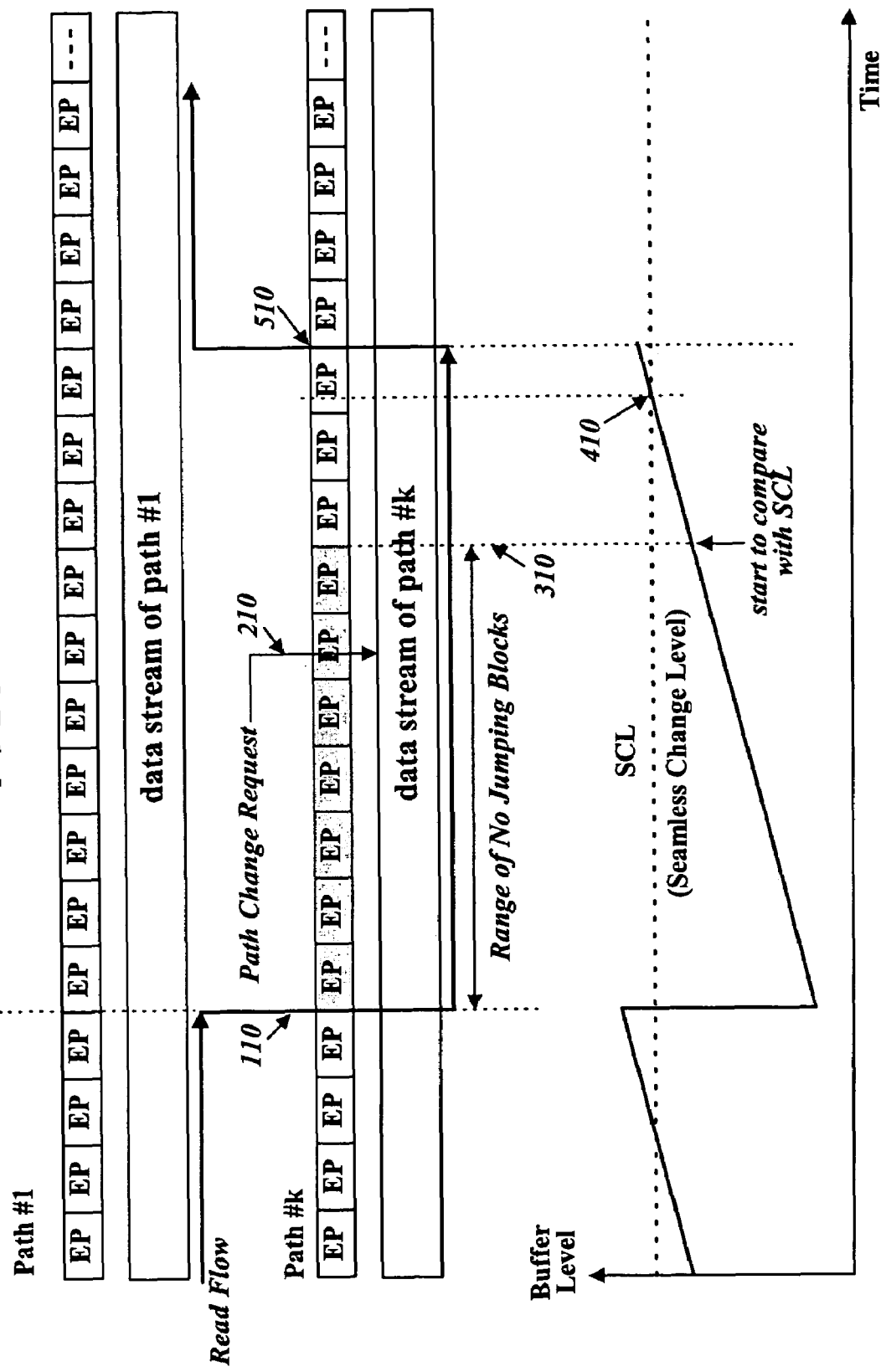
FIG. 5 illustrates a graphical representation of a second embodiment of a reproduction path changing method in accordance with the present invention.

FIG. 5 illustrates the above embodiment. In the illustrative case of FIG. 5, it is assumed that the controller 10 has conducted a requested path change according to request of path change from Path #1 to #k (110) during reproduction of a multi-path data stream, and reproduces Path-k data stream now.

If path change from Path #k to #1 is requested again (210) during reproduction of the data stream pertaining to Path #k after the path change from #1 to #k, the controller 10 examines if an entry point (EP) pointing an interval of Path-k data stream being currently reproduced falls within a preset number of no jump EPs that is counted just after path changed position. If the entry point lies within the number of no jump EPs, namely, within the range of NJBs, the controller 10 delays the path changing operation and keeps buffering the Path-k data stream in the buffer.

If another EP of the Path-k data stream interval being reproduced through the jumping delay gets away from the range of NJBs, the controller 10 starts to check whether the size of the buffered Path-k data stream exceeds the preset SCL (310). When the SCL is exceeded during the checking process (410), the controller 10 starts to check whether a stream interval pointed by a current EP is entirely buffered. If the stream interval is all buffered (510), the controller 10 conducts the delayed path changing operation.

While jump and search by the path change to Path #1 is being conducted, the controller 10 makes the Path-k data stream buffered in the buffer be presented through the source depacketizer 4, the demultiplexer 5 and the AV decoder 6. When the path change to Path #1 finishes, the controller 10 begins to reproduce the Path-1 data stream from the jumped location and buffers the reproduced Path-1 data stream next to the remaining Path-k data stream in the buffer, thereby guaranteeing seamless presentation at the path changed stream position from Path #k to #1.

The information on the number of no jump EPs may be written in entry point map information contained in the clip information file in which the entry points are also recorded or may be written in a playlist file.

The number of no jump EPs may be set individually for each entry point depending on the data stream interval associated with each entry point. In this case, the number of no jump EPs set by the first EP related with a path-changed stream is used to restrict path re-change.

The number of no jump EPs associated with each entry point may be included in the entry point map in which the entry point is also recorded or may be recorded as separate no jumping block table (NJB Table) information on a disk.

The above-explained present invention provides method and apparatus of reproducing a multi-path data stream recorded on a high-density optical disk that ensures seamless reproduction of video and audio even when reproduction path is changed during reproduction.

While the invention has been disclosed with respect to a limited number of embodiments, those skilled in the art, having the benefit of this disclosure, will appreciate numerous modifications and variations therefrom. For example, while described with respect to a Blu-ray ROM optical disk in several instances, the present invention is not limited to this standard of optical disk or to optical disks. It is intended that the appended claims cover all such modifications and variations as fall within the true spirit and scope of the invention.

What is claimed is:

1. A method for reproducing a multi-path data stream recorded on a recording medium, comprising the steps of:
   (a) reproducing the multi-path data stream;
   (b) responsive to a request for a path change, checking if the size of buffered data stream of a current path being reproduced exceeds a preset reference; and
   (c) delaying jumping operation to a data stream of a target path specified by the request based on the result of said checking step (b).

2. The method set forth in claim 1, wherein said preset reference is a value to prevent buffer underrun during jumping to other path.

3. The method set forth in claim 1, wherein said step (c) delays jumping to the target path and, instead, keeps reproducing and buffering the data stream of the current path if the size of the buffered data stream is not larger than the preset reference.

4. The method set forth in claim 1, wherein said step (c) conducts jumping operation to the target path while making presentation of the buffered data stream, if the size of the buffered data stream is larger than the preset reference.

5. The method set forth in claim 4, wherein said step (c) comprises the steps of:
   starting to check whether a stream interval of the current path pointed by an entry point is entirely buffered, if the size of the buffered data stream is larger than the preset reference; and
   conducting jumping operation to the target path while making presentation of the buffered data stream after the stream interval is all buffered.

6. A method for reproducing a multi-path data stream recorded on a recording medium, comprising the steps of:
   (a) reproducing the multi-path data stream;
   (b) responsive to a request for a path change, checking if an entry point pointing to a data stream interval of a current path being reproduced falls within a range of no jumping blocks; and
   (c) delaying jumping operation to a data stream of a target path specified by the request based on the result of said checking step (b).

7. The method set forth in claim 6, wherein said step (c) further comprises the steps of:
   (c1) checking if the size of buffered data stream of the current path is larger than a preset reference, if the entry point is beyond the range of no jumping blocks; and (c2) conducting jumping operation to the target path while making presentation of the buffered data stream, if the size of the buffered data stream is larger than the preset reference.

8. The method set forth in claim 7, wherein said step (c2) comprises the steps of:
   starting to check whether a stream interval of the current path pointed by an entry point is entirely buffered, if the size of the buffered data stream is larger than the preset reference; and
   conducting jumping operation to the target path while making presentation of the buffered data stream after the stream interval is all buffered.

9. The method set forth in claim 6, wherein the range of no jumping blocks is specified by the number of entry points that is counted from a previous path-changed point on the data stream.

10. The method set forth in claim 9, wherein the number of entry points corresponding to the range of no jumping blocks is constant wherever path is changed on the multi-path data stream.

11. The method set forth in claim 9, wherein the number of entry points corresponding to the range of no jumping blocks can vary depending on path-changed points on the multi-path data stream.

12. The method set forth in claim 9, wherein the range of no jumping blocks is set a minimum length that is unlikely to cause a buffer underrun during jumping to other path.

13. The method set forth in claim 6, wherein information about the range of no jumping blocks is recorded in a clip information file in which entry points are recorded or in a playlist file, or in both files.

14. An apparatus for reproducing a multi-path data stream recorded on a recording medium, comprising:
   a driver for driving an optical reproducing device to reproduce a data stream of a selected path among the multi-path data stream recorded on the recording medium;
   storing means for buffering the reproduced data stream of the selected path; and
   a controller for checking, responsive to a request for a path change, if the size of the data stream of the selected path buffered in the storing means is larger than a preset reference and for delaying jumping operation to a data stream of a target path specified by the path change request based on the checking result.

15. The apparatus set forth in claim 14, wherein said controller further controls the driver to conduct the jumping operation to the target path while making presentation of the buffered data stream, if the size of the buffered data stream is larger than the preset reference.

16. An apparatus for reproducing a multi-path data stream recorded on a recording medium, comprising:
   a driver for driving an optical reproducing device to reproduce a data stream of a selected path among the multi-path data stream recorded on the recording medium;
   storing means for buffering the reproduced data stream of the selected path; and
   a controller for checking, responsive to a request for a path change, if an entry point pointing to a data stream interval of the selected path being buffered in the storing means falls within a range of no jumping blocks, and for delaying jumping operation to a data stream of a target path specified by the path change request based on the checking result.

17. The apparatus set forth in claim 16, wherein said controller further checks if the size of buffered data stream of the selected path is larger than a preset reference, if the entry point is beyond the range of no jumping blocks, and controls the driver to jump to the target path while making presentation of the buffered data stream, if the size of the buffered data stream is larger than the preset reference.

* * * * *